US009444368B2

United States Patent
Chemin (10) Patent No.: US 9,444,368 B2
(45) Date of Patent: Sep. 13, 2016

(54) METHOD FOR CONTROLLING A POWER BRIDGE, AND CORRESPONDING CONTROL DEVICE, POWER BRIDGE AND ROTARY ELECTRIC MACHINE SYSTEM

(71) Applicant: VALEO EQUIPEMENTS ELECTRIQUES MOTEUR, Creteil (FR)

(72) Inventor: Michaël Chemin, La Queue en Brie (FR)

(73) Assignee: Valeo Equipements Electriques Moteur (FR)

( * ) Notice: Subject to any disclaimer, the term of this patent is extended or adjusted under 35 U.S.C. 154(b) by 0 days.

(21) Appl. No.: 14/383,759

(22) PCT Filed: Mar. 4, 2013

(86) PCT No.: PCT/FR2013/050452
§ 371 (c)(1),
(2) Date: Sep. 8, 2014

(87) PCT Pub. No.: WO2013/132182
PCT Pub. Date: Sep. 12, 2013

(65) Prior Publication Data
US 2015/0108935 A1    Apr. 23, 2015

(30) Foreign Application Priority Data
Mar. 7, 2012 (FR) ..................... 12 52075

(51) Int. Cl.
*H02P 27/08* (2006.01)
*H02M 7/5387* (2007.01)
(Continued)

(52) U.S. Cl.
CPC ........ *H02M 7/5387* (2013.01); *B60L 11/1803* (2013.01); *B60L 11/1862* (2013.01);
(Continued)

(58) Field of Classification Search
CPC ....................................................... H02P 27/08
USPC ................................................. 318/504, 494
See application file for complete search history.

(56) References Cited

U.S. PATENT DOCUMENTS

| 5,672,950 A * | 9/1997 | Kemp ..................... H02P 27/16 318/801 |
| 6,528,964 B2 * | 3/2003 | Schulz .................. H02P 25/085 318/432 |

(Continued)

FOREIGN PATENT DOCUMENTS

| DE | 102008054744 | 6/2010 |
| FR | 2895597 | 6/2007 |

(Continued)

OTHER PUBLICATIONS

Elbahawy, Alan, A Simple Guide to Selecting Power MOSFETs, Ednmag, Nov. 22, 2001, pp. 87-90.

*Primary Examiner* — David S Luo
(74) *Attorney, Agent, or Firm* — Berenato & White, LLC (57) ABSTRACT

A method performed in a power bridge (3) comprising multiple arms (B1, B2, Bi, Bn). Each arm comprises upper and lower semiconductor switches arranged in series and connected in parallel to first and second terminals (B+, B−) of a common voltage source (2). The mid-point of the arm is connected to a phase of an electrical load (1). The aforementioned switches are controlled complementarily by pulses having a duty factor set value (RC1, RC2, RCi, RCn) determined as a function of a first phase voltage set value (V1, V2, Vi, Vn) in relation to a reference terminal of the electrical load (1) and of a common-mode voltage (V0) in relation to one of the first or second terminals, such as to control the switching losses of the switches. The common-mode voltage (V0) is determined such as to balance switching losses and conduction losses between the switches.

16 Claims, 3 Drawing Sheets

(51) Int. Cl.
  *B60L 15/00* (2006.01)
  *H02M 7/5395* (2006.01)
  *B60L 11/18* (2006.01)
  *H02M 1/32* (2007.01)

(52) U.S. Cl.
  CPC .......... *B60L15/007* (2013.01); *H02M 7/5395* (2013.01); *H02P 27/08* (2013.01); *H02P 27/085* (2013.01); *B60L 2240/421* (2013.01); *B60L 2240/525* (2013.01); *H02M 2001/327* (2013.01); *Y02T 10/644* (2013.01); *Y02T 10/645* (2013.01); *Y02T 10/7005* (2013.01); *Y02T 10/705* (2013.01); *Y02T 10/7044* (2013.01)

(56) References Cited

U.S. PATENT DOCUMENTS 7,274,241 B2 * 9/2007 Ho .......................... H02M 1/44
          327/170
7,629,764 B2 * 12/2009 Shoemaker .......... G05B 13/042
          318/432

FOREIGN PATENT DOCUMENTS

| JP | 2003189668 | 7/2003 |
| WO | 0231952 | 4/2002 |

* cited by examiner

METHOD FOR CONTROLLING A POWER BRIDGE, AND CORRESPONDING CONTROL DEVICE, POWER BRIDGE AND ROTARY ELECTRIC MACHINE SYSTEM

CROSS-REFERENCE TO RELATED APPLICATIONS AND CLAIM TO PRIORITY

This application is a national stage application of International Application No. PCT/FR2013/050452 filed Mar. 4, 2013, which claims priority to French Patent Application No. 1252075 filed Mar. 7, 2012, of which the disclosures are incorporated herein by reference and to which priority is claimed.

TECHNICAL FIELD OF THE INVENTION

The present invention relates to a method for controlling a power bridge which supplies a monophase or polyphase electric load, as well as to the corresponding control device.

The invention also relates to an associated power bridge, as well as to its application to a rotary electrical machine system, in particular for a motor vehicle.

TECHNOLOGICAL BACKGROUND OF THE INVENTION

The rotary electrical machines which are produced in a large range of power levels and speeds are being used increasingly at present in the motor vehicle industry, as a result of considerations of protection of the environment.

They have applications in vehicles of the all electric type, as well as in low $CO_2$ emission vehicles of the so-called mild-hybrid and full-hybrid types.

The mild-hybrid applications generally relate to electrical machines of approximately 8 to 10 kW, for example an electric motor which is fitted on the front surface of a thermal engine, and is coupled to the latter by means of a drive belt. With an electric motor of this type, it is possible to reduce the thermal motorisation capacity (engine downsizing), by providing electric torque assistance which supplies additional power, in particular during revving up. In addition, traction at low speed, for example in an urban environment, can also be ensured by this same electric motor.

Applications of the full-hybrid type generally relate to 30 to 50 kW motors for architectures of the series and/or parallel type with a more highly developed level of integration of the electric motor(s) in the traction chain of the vehicle.

These machines are polyphase machines which are supplied by the on-board battery by an inverter which makes it possible to generate the different phase currents.

The inverters which are used most commonly are inverters with two levels, i.e. they consist of a power bridge comprising a plurality of arms (generally one arm per phase), each comprising two power semiconductors which function in switching. A middle point of each pair is connected to a phase of the rotary electrical machine.

The power semiconductors are either bipolar transistors, in which case they are associated with free wheel diodes, or transistors of the MOSFET type, the intrinsic diode of which permits circulation of the current in two directions.

These semiconductor switches are controlled in a complementary manner by an electronic control unit, such as to generate the phase voltages necessary for functioning of the electrical machine according to a well-known technique of pulse width modulation (PWM).

The high power level reached by these machines is leading manufacturers to try to improve the performance of the associated inverters, by limiting the switching losses and the conduction losses.

In document FR2895597, it is proposed to limit the switching losses. For this purpose, a common mode voltage is adjusted such that one of the phase voltages is connected to earth or to the +BAT, with precedence given to whichever of these passes the stronger current. Thus, there is constantly an arm which does not switch, which makes it possible to reduce the losses in the inverter.

In the PWM technique, a switching frequency is generally fixed, whereas the wave forms of the phase voltages (sinusoidal for example) are obtained by modulating the duty cycles to an electrical frequency which depends on a speed of rotation of the machine.

In general, the electrical frequency is several hundred Hertz. The junction temperature of the MOSFETs (which reflects the losses) does not follow this instantaneous variation, since it is filtered by the thermal capacitors of the chip-case-substrate assembly.

However, in the phases of starting of the rotary electrical machine, or with the rotor blocked, the electrical frequency is very low, or zero. The thermal filtering of the assembly no longer operates: the losses to be taken into account are instantaneous losses, and not in the medium term.

GENERAL DESCRIPTION OF THE INVENTION

The object of the present invention is therefore to minimise the instantaneous losses in the arms of a power bridge, in order to maximise the admissible current within the limit of the thermal dissipation of the arms at low electrical frequencies.

Its subject is specifically a method for controlling a power bridge comprising a plurality of arms each comprising in series upper and lower semiconductor switches which are designed to be connected in parallel to the first and second terminals of common source of voltage, at least one middle point of each of the arms being designed to be connected respectively to at least one phase of an electric load.

The method in question is of the type consisting of controlling the upper and lower semiconductor switches in a complementary manner by means of pulses with a set duty cycle which is determined according to:
- a first set phase voltage, relative to a reference terminal of the electric load;
- a common mode voltage, relative to one of the first or second terminals controlling switching losses of the upper and lower semiconductor switches.

The method according to the invention is distinguished in that this common mode voltage is determined such as to obtain balancing of the switching losses and conduction losses between the upper and lower semiconductor switches.

According to the invention, this balancing is advantageously implemented only when an electrical frequency which modulates the set duty cycle is equal to, or lower than, a predetermined threshold.

Preferably, this common mode voltage is on the other hand determined such as to minimise the switching losses when the electrical frequency is higher than this predetermined threshold.

The method for controlling a power bridge according to the invention is also distinguished in that this balancing is obtained by selecting a balancing duty cycle $RC'_i$ such as to verify substantially the equation:

$$RC'_0 * R_{onH} * Iph_0^2 + P_{comm} = (1 - RC'_0) * R_{onL} * Iph_0^2$$

wherein $R_{onH}$ and $R_{onL}$ are respectively the conduction resistances 20 of the upper and lower semiconductor switches 4, $P_{comm}$ represents the switching losses, and $Iph_i$ represents a phase intensity which circulates in the phase concerned, within a limit where the balancing duty cycle leads to a first balancing phase voltage, a current difference of which, compared with a second balancing phase voltage, is identical to an initial difference between the first set phase voltage and a second set phase voltage.

The balancing is preferably carried out only in a reference arm where the phase intensity is the greatest from amongst the power bridge arms.

It is highly advantageously obtained by modulating the set duty cycle corresponding to each of the arms of the power bridge by a difference of duty cycle between a reference value of a set duty cycle, and a balancing value of a balancing duty cycle determined in this reference arm.

The invention also relates to a device for controlling a power bridge, which is designed to be connected to an electric load, and is suitable for implementation of the above-described method.

This control device is distinguished in that it comprises a control logic which is representative of the method according to the invention, or a computer memory comprising instructions which are representative of this method.

Within the context of the invention, a power bridge which can be controlled by the aforementioned control device generally comprises a plurality of arms each comprising in series upper and lower semiconductor switches.

These upper and lower semiconductor switches advantageously each consist of a semiconductor switching element and a free wheel diode in parallel.

Preferably, the free wheel diode is an intrinsic diode of a transistor of the MOSFET type.

Advantage will be derived from a rotary electrical machine system according to the invention comprising:
  a polyphase electric load;
  a source of voltage;
  a power bridge with the characteristics specified above, which is connected downstream to this electric load and upstream to the source of voltage;
  a control device as previously described.

These few essential specifications will have made apparent to persons skilled in the art the advantages provided by the invention in comparison with the prior art.

The detailed specifications of the invention are provided in the description which follows in association with the appended drawings. It should be noted that these drawings serve the purpose simply of illustrating the text of the description, and that they do not constitute in any way a limitation of the scope of the invention.

DESCRIPTION OF PREFERRED
EMBODIMENTS OF THE INVENTION

The preferred embodiments of the invention correspond to an inverter which supplies a polyphase rotary electrical machine 1 from a battery 2.

Figure 1:
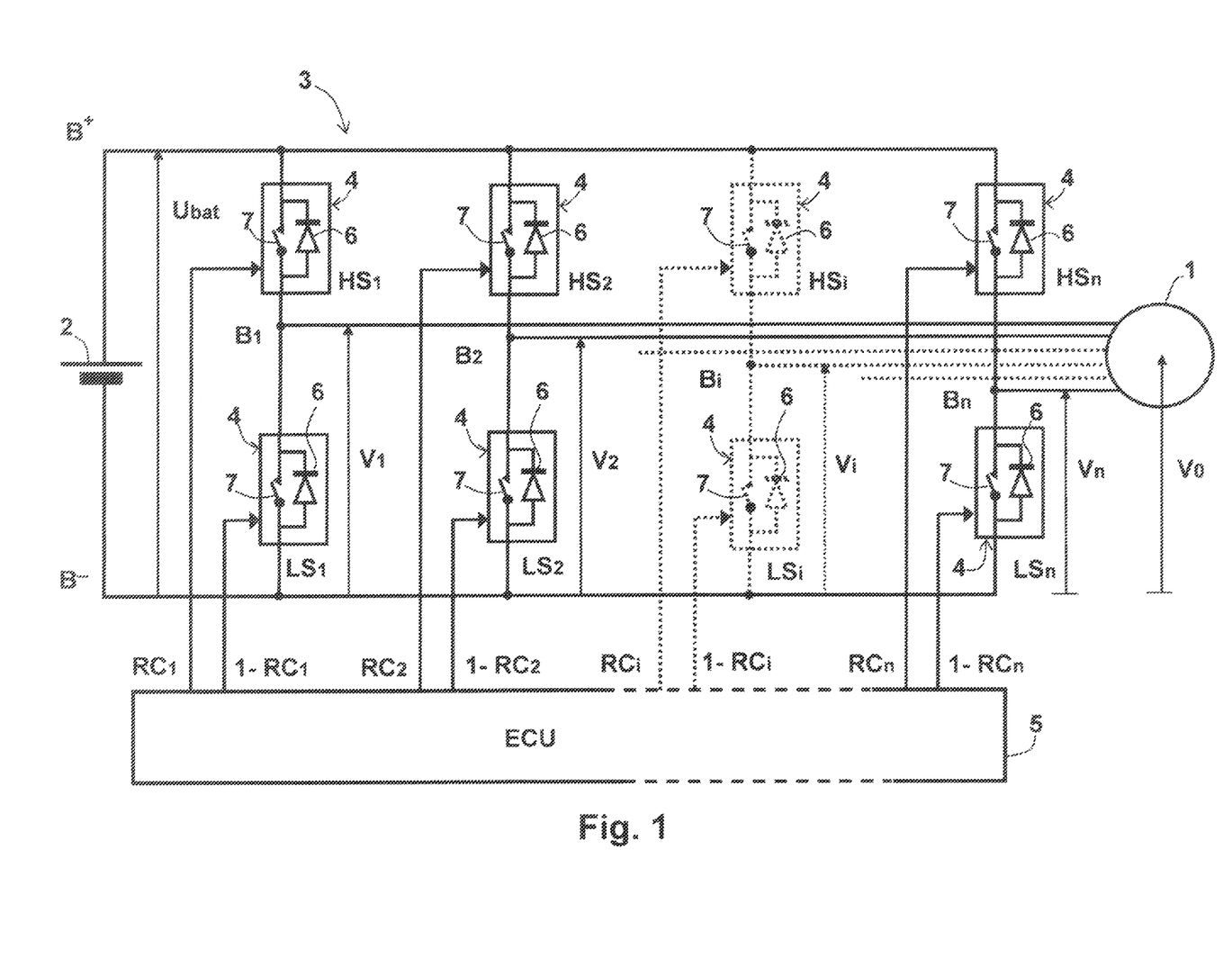
FIG. 1 is a process diagram of a rotary electrical machine system comprising a power bridge controlled by the method according to the invention.

In general, it is a machine 1 with a number n of phase windings connected to the middle points of the arms $B_1$, $B_2$, $B_i$, $B_n$ of a semiconductor power bridge 3 as represented in FIG. 1 (n is preferably equal to 3).

According to a known arrangement, the power bridge 3 has arms $B_1$, $B_2$, $B_i$, $B_n$ each comprising semiconductor switches 4 which can be controlled, which connect the phase windings firstly to the positive pole $B^+$ of the battery 2 (upper semiconductor switches $HS_1$, $HS_2$, $HS_i$, $HS_n$ of the high side), and secondly to the negative pole if of the battery 2 (lower semiconductor switches $LS_1$, $LS_2$, $LS_i$, $LS_n$ of the low side).

An electronic control unit 5 opens and closes the high side and low side switches 4 alternately, according to a well-known operating mode of an inverter 3, in order to adjust the currents $Iph_1$, $Iph_2$, $Iph_i$, $Iph_n$ in the phases.

The upper switch/lower switch conduction ratio is known as the duty cycle (RC). With a battery voltage 2 being Ubat, a phase voltage Uph applied to the machine is then:

$$Uph = RC * Ubat$$

Modulation of the duty cycle RC modulates the phase voltage Uph applied to the machine 1, and consequently the phase current Iph.

The semiconductor switches 4 used are preferably power transistors of the MOSFET type, the intrinsic diode 6 of which ensures the characteristic of having two-way current.

Alternatively, the semiconductor switches 4 consist of a switching element 7 such as a bipolar power transistor 7 and a free wheel diode 6.

The losses in the MOSFET are of two types, i.e. by conduction $P_{cond.}$ and by switching $P_{comm}$.

The conduction losses $P_{cond.}$ in an arm $B_i$ are equal to $R_{on} * Iph_i^2$ ($R_{on}$ being a resistance of the MOSFET in the passing state) irrespective of the duty cycle RC, since the phase current $Iph_i$ circulates either in the upper switch $HS_i$ or in the lower switch $LS_i$, and therefore always in a single MOSFET.

The switching losses $P_{comm.}$ depend on the voltage and the current switched. These losses are dissipated only in a single MOSFET, which is lower or upper according to the direction of the phase current.

As stated in the preamble, it is known, in particular from document FR2895597, to reduce the switching losses $P_{comm.}$ by limiting the number of switching operations by modifying a common mode voltage $V_o$.

This strategy has a disadvantage, in particular when the rotor of the electrical machine 1 is blocked, as shown by the following two numerical examples.

Example 1

A system 1, 2, 3, 4, 5 comprises a battery 2 with a voltage $U_{bat}$ of 100 V, and a three-phase machine 1, the rotor of which is blocked.

The electronic control unit 5 generates three set duty cycles:
$RC_1 = 0.60$ $RC_2 = 0.45$ $RC_3 = 0.45$ which produces three set phase voltages (relative to the earthing terminal B−):

$V_1=60V$ $V_2=45$ V $V_3=45V$

The common mode voltage $V_0$ is $(V_1+V_2+V_3)/3=50$ V

The voltages applied to the phase windings are:

$V_1-V_2=15$ V $V_2-V_3=0$ V $V_3-V_1=-15$ V which generates the phase intensities (in arbitrary units):

$Iph_1=+1$ $Iph_2=-\frac{1}{2}$ $Iph_3=-\frac{1}{2}$

The losses in the upper MOSFET $HS_1$ of the arm $B_1$ are:

conduction losses: $P_{cond.}=RC_1 * R_{on} * IPh_1^2$ switching losses: $P_{comm.}=\frac{1}{3} * R_{on} * Iph_1^2$ (by simplification).

The total losses in the upper MOSFET $HS_1$ are therefore:

$P_{cond.}+P_{comm.}=(RC_1+\frac{1}{3})*R_{on}*Iph_1^2$, i.e. $0.93*R_{on}$.

The losses in the lower MOSFET $LS_1$ of the arm $B_1$ are only the conduction losses, since the switching losses have already been withstood by the upper MOSFET The total losses in the lower MOSFET $LS_1$ are therefore:

$P_{cond.}(1-RC_1)*R_{on}*Iph_1^2$, i.e. $0.40*R_{on}$.

The global losses of the arm are therefore:

$(0.6+\frac{1}{3})*R_{on}+0.40*R_{on}=4/3*R_{on}$

Example 2

The strategy of decreasing the losses by limited the number of switching operations implies blocking the arm where the phase intensity is greatest, and in this case the arm $B_1$.

For this purpose, the set duty cycle $RC_1$ becomes an optimised duty cycle $RCop_1$, such that $RCop_1=1$.

The two other set duty cycles $RC_2$ and $RC_3$ are increased by $RCop_1-RC_1$ in order to maintain the same voltage differences between phases, by increasing the common mode voltage:

$RCop_1=1$ $RCop_2=0.85$ $RCop_3=0.85$ $Vop_1=100$ V $Vop_2=85$ V $Vop_3=85$ V

The optimised common mode voltage is $Vop_0=90$ V.

The machine 1 still has the same phase voltages:

$Vop_1-Vop_2=15$ V $Vop_2-Vop_3=0$ V $Vop_3-Vop_1=-15$ V

In this case, the losses are only conduction losses, since the arm $B_1$ no longer switches. The total losses are therefore:

$P_{cond.}=RCop_1*R_{on}*Iph_1^2$ i.e. $R_{on}$

The losses in the upper MOSFET $HS_1$ derived form the known strategy of minimisation are therefore in fact 7% higher than those derived from PWM control without optimisation.

Figure 2:
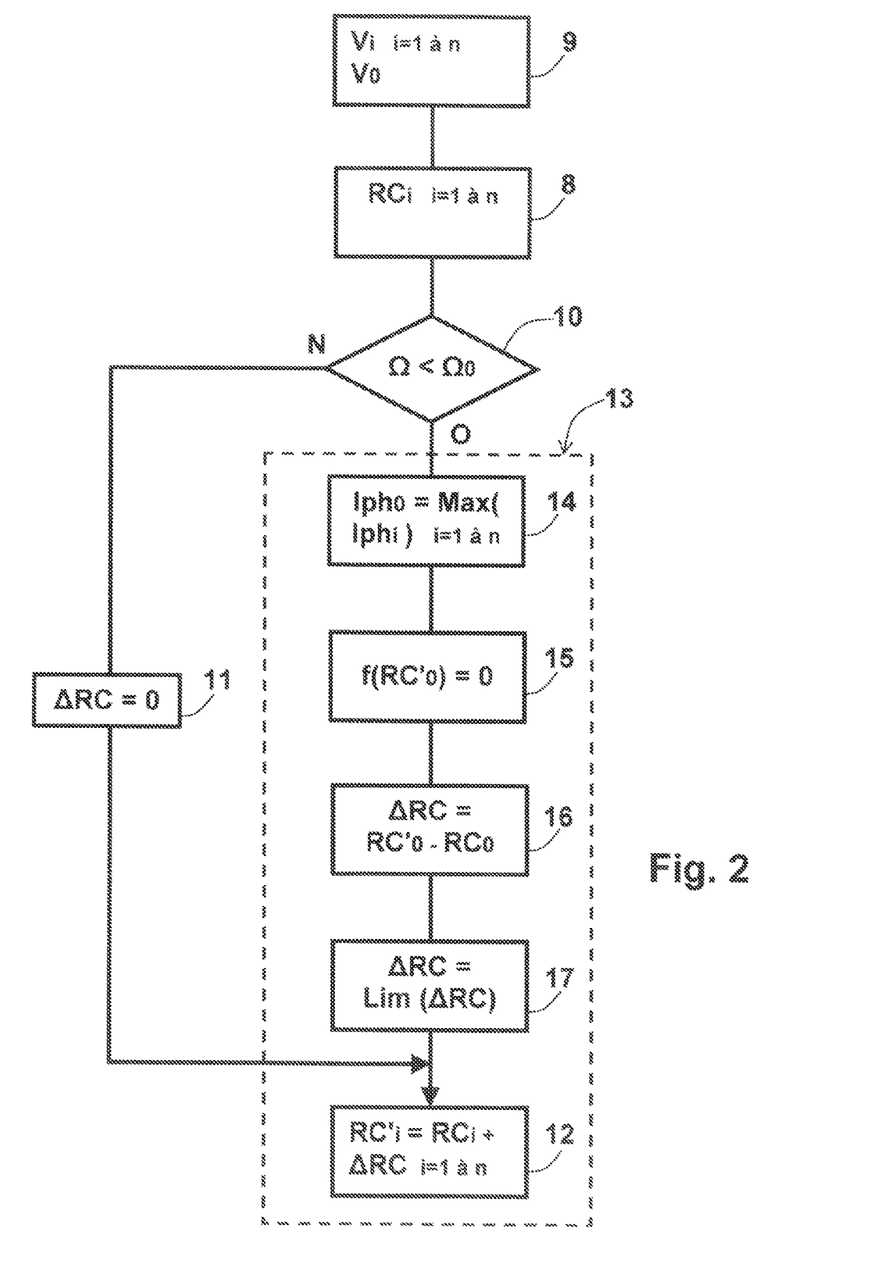
FIG. 2 is a general flow chart representing the method for controlling a power bridge according to the invention.

The method for controlling a power bridge 3 according to the invention tends on the other hand to limit the losses in a MOSFET of this type, when the machine 1 is started and when the rotor is blocked, by accepting a slight deterioration of the global performance of the inverter 3 in these circumstances, as will be demonstrated hereinafter in association with FIGS. 2 and 3.

The method according to the invention consists initially of generating in a conventional manner in a preliminary step 8 the set duty cycles $RC_1$, $RC_2$, $RC_i$, $RC_n$ corresponding to the set phase voltages $V_1$, $V_2$, $V_i$, $V_n$ of vectorial control of the machine 1 supplied to the input 9.

A test 10 makes it possible to determine whether the machine 1 is in the process of starting or has its rotor blocked, by comparing an electrical frequency which modulates these set duty cycles $RC_1$, $RC_2$, $RC_i$, $RC_n$ at a predetermined threshold, or in an equivalent manner by comparing a speed of rotation n of the machine 1 with a reference speed of rotation $\Omega_0$.

In the case when the speed of rotation $\Omega$ is greater than $\Omega_0$, the machine 1 is not in the process of starting, or the rotor is not blocked, the method according to the invention preferably does not make any modification 11 to the set duty cycles $RC_1$, $RC_2$, $RC_i$, $RC_n$, which are transferred in an identical manner to the output 12.

Alternatively, the set duty cycles $RC_1$, $RC_2$, $RC_i$, $RC_n$ are modified such that the common mode voltage $V_0$ minimises the switching losses $P_{comm.}$ (process not represented).

In the case when the speed of rotation $\Omega$ is smaller than, or equal to $\Omega_0$, the machine 1 is in the process of starting, or the rotor is blocked, the method according to the invention proceeds with a process of balancing 13 of the semiconductor switch 4 losses of the arm $B_1$, $B_2$, $B_i$, $B_n$, or circulates a greater phase intensity $Iph_1$, $Iph_2$, $Iph_i$, $Iph_n$.

A first step 14 of this balancing process 13 therefore consists of selecting a reference arm of the power bridge 3 in which a phase intensity $Iph_1$, $Iph_2$, $Iph_i$, $Iph_n$ has a greater value $Iph_0$.

A second step 15 of this balancing process 13 consists of balancing the switching $P_{comm.}$ and conduction $P_{cond.}$ losses between the upper $HS_i$ and lower $LS_i$ semiconductor switches in this reference arm.

The switching losses $P_{comm.}$ are independent from the duty cycle, and are dissipated by only one of the upper $HS_i$ or lower $LS_i$ semiconductor switches 4, according to the direction of the current.

The conduction losses $P_{cond.}$ are distributed between the upper $HS_i$ and lower $LS_i$ semiconductor switches 4 by selecting an appropriate balancing duty cycle $RC'_1$, $RC'_2$, $RC'_i$, $RC'_n$ within the limit where the balancing phase voltage differences encountered by the machine 1 remain identical to the set phase voltage differences $V_1$, $V_2$, $V_i$, $V_n$.

In the reference arm, during this second step 15, there is selection of a balancing value $RC'_0$ of a balancing duty cycle $RC'_1$, $RC'_2$, $RC'_i$, $RC'_n$. such as to verify the equation:

$RC'_0 * R_{on} * Iph_0^2 + P_{comm.}=(1-RC'_0)*R_{on}*Iph_0^2$

This equation expresses the equality of the losses between the upper $HS_i$ and lower $LS_i$ semiconductor switches of the reference arm. This can be written in the form:

$f(RC'_0)=(2*RC'_0-1)*R_{on}*Iph_0^2=P_{comm.}=0$

It will be noted here that the above equations correspond to the case when the upper $HS_i$ and lower $LS_i$ semiconductor switches have conduction resistances $R_{on}$ which are substantially equal. When these conduction resistances have different values, known as $R_{onH}$ for the upper $HS_i$ semiconductor switch, and $R_{onL}$ for the lower $LS_i$ semiconductor switch, the above equation to be verified becomes:

$RC'_0 * R_{onH} * Iph_0^2 + P_{comm.}=(1-RC'_0)*R_{onL}*IPph_0^2$

Hereinafter in the description, it will continue to be considered that the upper $HS_i$ and lower $LS_i$ semiconductor switches have conduction resistances $R_{on}$ which are substantially equal.

According to the modelling selected for the calculation of the switching losses $P_{comm.}$, the balancing value $RC'_0$ can vary according to the battery voltage $U_{bat}$ and the switched current $Iph_0$.

A third step 16 of this balancing process 13 consists of calculated a duty cycle difference ARC between this balancing value $RC'_0$ and the set duty cycle $RC_i$ in the reference arm taken as a reference value $RC_0$.

By being added to all the set duty cycles $RC_1$, $RC_2$, $RC_i$, $RC_n$, this duty cycle difference $\Delta RC$ makes it possible to generate at the output 12 of the method according to the invention the balancing duty cycles $RC'_1$, $RC'_2$, $RC'_i$, $RC'_n$ which maintain the voltage differences between phases by modifying the common mode voltage $V_0$, whilst balancing the reference arm.

An additional step 17 of the balancing process 13 limits the duty cycle difference $\Delta RC$, such that all the balancing duty cycles $RC'_1$, $RC'_2$, $RC'_i$, $RC'_n$ are contained in an interval from 0 to 1.

Figure 3:
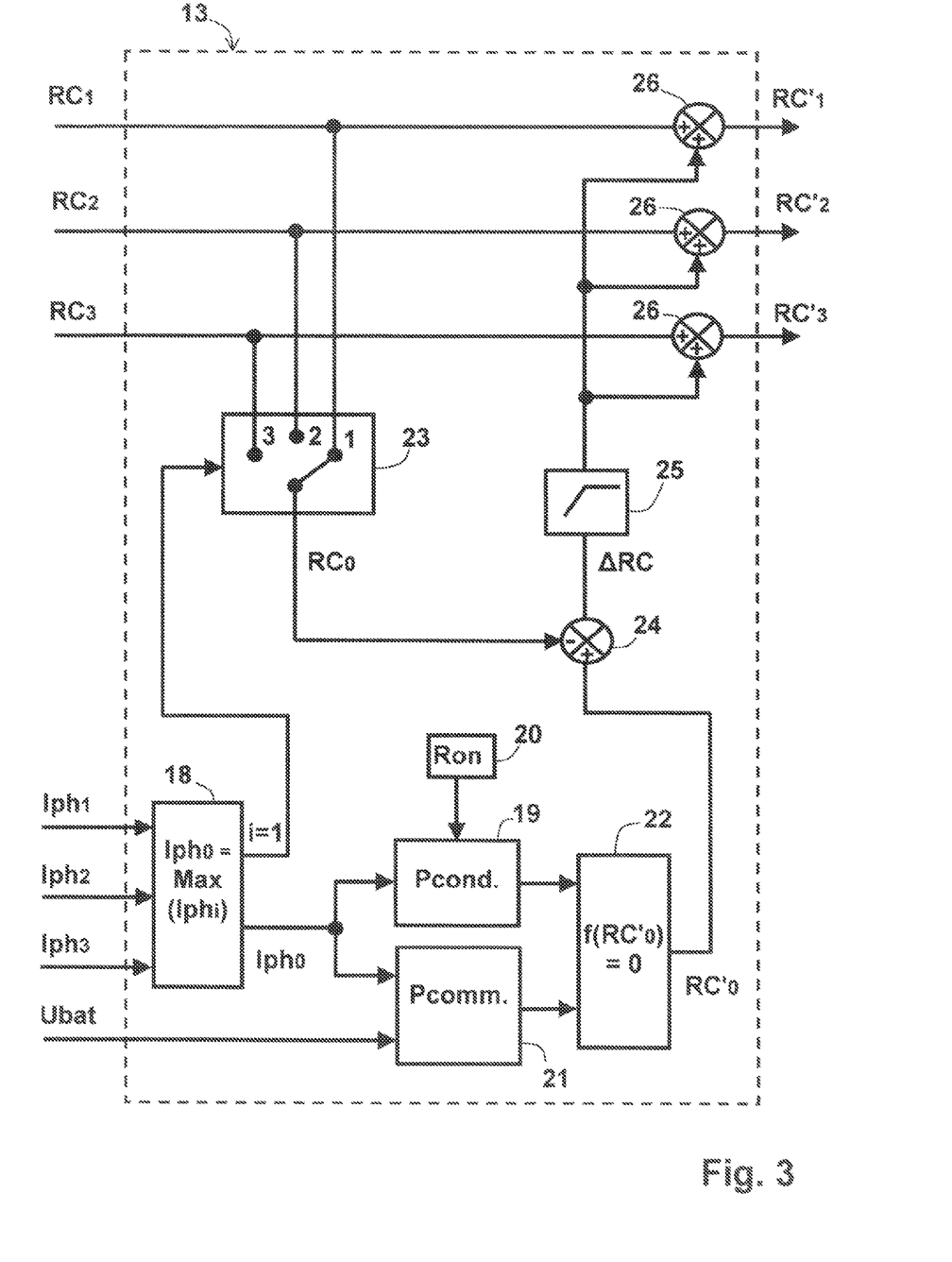
FIG. 3 represents schematically the balancing of the losses in an arm of a power bridge according to the invention.

In association with this FIG. 3, the following numerical example in the case of a power bridge formed by semiconductor switches 4 is represented in a detailed manner in FIG. 3. A three-phase electric load will make it possible to understand well the method for controlling a power bridge according to the invention.

Example According to the Invention

In the same way as in the above examples 1 and 2 which represent methods for controlling a power bridge 3 known in the prior art, this example is based on a system 1, 2, 3, 4, 5 which comprises a battery 2 with a voltage $U_{bat}$ of 100 V and a three-phase machine 1, the rotor of which is blocked.

The electronic control unit 5 generates three set duty cycles:
$RC_1=0.60$ $RC_2=0.45$ $RC_3=0.45$
which produce three set phase voltages (relative to the earthing terminal B$^-$:
$V_1=60$ V $V_2=45$ V $V_3=45$ V
The common mode voltage $V_0$ is $(V_1+V_2+V_3)/3=50$ V
The voltages applied to the phase windings are:
$V_1-V_2=15$ V $V_2-V_3=0$ V $V_3-V_1=-15$ V
which generate the phase intensities (in arbitrary units):
$Iph_1=+1$ $Iph_2=-1/2$ $Iph_3=-1/2$ The balancing process 13, which is preferably implemented in the form of a software module in the electronic control unit 5 of the power bridge 3, begins with selection 18 of the arm in which the phase intensity $Iph_0$ is the strongest out of the three phase intensities $Iph_1$, $Iph_2$, $Iph_3$. In this case, this is the arm number 1, wherein the intensity is $Iph_1=1=Iph_0$ (in arbitrary units).

The balancing process 13 then carries out:

a first calculation 19 of the conduction losses according to the resistance $R_{on}$ 20 which passes in the upper $HS_1$ and lower $LS_1$ MOSFETs, according to a balancing duty cycle $RC'1$ of the first arm, respectively $RC'_1*R_{on}*Iph_0^2$ and $(1-RC'_1)*R_{on}*Iph_0^2$;

a second calculation 21 of the switching losses (in this arm) $P_{comm.}=1/3*R_{on}*Iph_0^2$ (by simplification in this example);

determination 22 of the balancing value $RC'_0$ which satisfies the equation:

$$f(RC'_0)=(2*RC'_0-1)*R_{on}*Iph_0^2+P_{comm.}=0$$

in other words by using the simplified expression of the switching losses $P_{comm.}$:

$$(2*RC'0-1)*R_{on}*Iph_0^2+1/3*R_{on}*Iph_0^2=0, \text{ i.e. } RC'_0=1/3$$

The balancing process 13 then carries out the acquisition 23 of the reference value $RC_0$ of the set duty cycle corresponding to the reference arm determined during the selection 18, i.e. $RC_0=RC_1=0.6$.

This acquisition 23 permits evaluation 24 of the duty cycle difference:

$$\Delta RC=RC'_0=RC_0=0.33-0.60=-0.27$$

Since this duty cycle difference $\Delta RC$ is negative and lower in absolute value than the set duty cycles $RC_1=0.60$, $RC_2=0.45$, $RC_3=0.45$, the limitation function 25 determines that it is compatible with the range of balancing duty cycles supplied by a third calculation 26:

$$RC'_1=RC_1+\Delta RC=0.60-0.27=0.33$$

$$RC'_2=RC_2+\Delta RC=0.45-0.27=0.18$$

$$RC'_3=RC_3+\Delta RC=0.45-0.27=0.18$$

The balancing phase voltages are:
$V'_1=33$ V $V'_2=18$ V $V'_3=18$ V
The common mode voltage $V_0$ becomes $V'_0=23$ V
It is verified that the phase voltage differences encountered by the machine 1 have not changed:

$$V'_1-V'_2=33 \text{ V}-18 \text{ V}=15 \text{ V}$$

$$V'_2-V'_3=18 \text{ V}-18 \text{ V}=0 \text{ V}$$

$$V'_3-V'_1=18 \text{ V}-33 \text{ V}=-15 \text{ V}$$

Upon completion of this balancing process 13, the total losses in the upper and lower MOSFET 4 are:

$$RC'_1*R_{on}*Iph_0^2+1/3*R_{on}*Iph_0^2, \text{ i.e. } 2/3*R_{on} \quad \text{upper MOSFET } HS_1:$$

$$(1-RC'_1)*R_{on}*Iph_0^2+(1-1/3)*R_{on}*Iph_0^2, \text{ i.e. } 2/3* R_{on} \quad \text{lower MOSFET } LS_1:$$

By comparison with the results of the above first and second examples, the balancing of the losses in the arm by the method according to the invention permits a decrease in the losses to be dissipated by the upper MOSFET $HS_1$ of 27% in comparison with the conventional control, and of 33% in comparison with the strategy of minimisation of the losses by switching.

For the arm assembly, the losses become $4/3*R_{on}$, i.e. they are identical to those generated by conventional PWM control (example 1) but have increased by 33% in comparison with the strategy of minimisation of the losses by switching (example 2).

However, the improved performance of the inverter is not what is sought during a phase of starting of the rotary electrical machine 1 connected, or in the case when the rotor is blocked. On the other hand, the maximisation of the current admissible within the limit of the thermal dissipation of the components becomes a more important criterion, in particular when the rotary electrical machine 1 in question is integrated in a system which relates to motor vehicle applications, and will be subjected to many stopping restarting cycles.

It will be appreciated that the invention is not limited simply to the above-described preferred embodiments.

In particular, the numerical values given simply constitute examples which are designed to demonstrate specifically the advantages of the method for controlling a power bridge 3 according to the invention.

The method according to the invention is preferably implemented by means of a micro-programme in the control device 5. However, this control device 5 can alternatively be based on wired control logic.

Nor are the power transistors of the MOSFET type 4 referred to restrictive: persons skilled in the art will be able to implement as required any other type of semiconductor elements such as bipolar transistors, other types of field effect transistors, or thyristors which can fulfil the same switching functions in a power bridge which can be controlled by the control device 5 according to the invention.

The invention thus incorporates all the possible variant embodiments which will remain within the scope defined by the following claims.

The invention claimed is:

1. Method for controlling a power bridge (3) comprising a plurality of arms (B1, B2, Bi, Bn) each comprising in series upper and lower semiconductor switches (4) which are designed to be connected in parallel to the first and second terminals (B+, B−) of a common source of voltage (2), at least one middle point of each of said arms (B1, B2, Bi, Bn) being designed to be connected respectively to at least one phase of an electric load (1), said method being of the type consisting of controlling said upper and lower semiconductor switches (4) in a complementary manner by means of pulses with a set duty cycle (RC1, RC2, RCi, RCn) which is determined according to a first set phase voltage (V1, V2, Vi, Vn), relative to a reference terminal of said electric load (1), and a common mode voltage (V0), relative to one of said first or second terminals (B+, B−) controlling switching losses (21) of said upper and lower semiconductor switches (4), wherein said common mode voltage (V0) is determined such as to obtain balancing (13) of said switching losses (21) and conduction losses (19) between said upper and lower semiconductor switches (4), and said balancing (13) is implemented only when an electrical frequency which modulates said set duty cycle (RC1, RC2, RCi, RCn) is equal to, or lower than, a predetermined threshold; and, wherein said common mode voltage (V0) is determined such as to minimize said switching losses (21) when said electrical frequency is higher than said predetermined threshold.

2. Method for controlling a power bridge (3) according to claim 1, characterized in that said balancing (13) is obtained by selecting (15, 22) a balancing duty cycle (RC1, RC2, RCi, RCn) such as to verify substantially the equation:

$$RC'0*RonH*Iph02+Pcomm.=(1-RC'0)*RonL*Iph02$$

wherein RonH and RonL are respectively the conduction resistances (20) of said upper and lower semiconductor switches (4), Pcomm. represents said switching losses (21), and Iphi represents a phase intensity which circulates in said phase, within a limit where said balancing duty cycle (RC'1, RC'2, RC'i, RC'n) leads to a first balancing phase voltage, a current difference of which, compared with a second balancing phase voltage, is identical to an initial difference between said first set phase voltage (V1, V2, Vi, Vn), and a second set phase voltage (V1, V2, Vi, Vn).

3. Method for controlling a power bridge (3) according to claim 2, characterized in that said balancing (13) is carried out only in a reference arm where said phase intensity (Iphi) is the greatest (14, 18) from amongst said arms (B1, B2, Bi, Bn).

4. Method for controlling a power bridge (3) according to claim 3, characterized in that said balancing (13) is obtained by modifying (12, 26) said set duty cycle (RC1, RC2, RCi, RCn) corresponding to each of said arms (B1, B2, Bi, Bn) by a difference of duty cycle (ARC) between a reference value (RC0) of a set duty cycle (RC1, RC2, RCi, RCn), and a balancing value (RC'0) of a balancing duty cycle (RC'1, RC'2, RC'i, RC'n) determined (16, 24) in said reference arm.

5. Device (5) for controlling a power bridge (3), which is designed to be connected to an electric load (1), and is suitable for implementation of the method according to claim 4, characterized in that it comprises a control logic which is representative of said method, or a computer memory comprising instructions which are representative of said method.

6. Device (5) for controlling a power bridge (3), which is designed to be connected to an electric load (1), and is suitable for implementation of the method according to claim 3, characterized in that it comprises a control logic which is representative of said method, or a computer memory comprising instructions which are representative of said method.

7. Device (5) for controlling a power bridge (3), which is designed to be connected to an electric load (1), and is suitable for implementation of the method according to claim 2, characterized in that it comprises a control logic which is representative of said method, or a computer memory comprising instructions which are representative of said method.

8. Device (5) for controlling a power bridge (3), which is designed to be connected to an electric load (1), and is suitable for implementation of the method according to claim 1, characterized in that it comprises a control logic which is representative of said method, or a computer memory comprising instructions which are representative of said method.

9. Power bridge (3) which can be controlled by the control device (5) according to claim 8, comprising a plurality of arms (B1, B2, Bi, Bn) each comprising in series upper and lower semiconductor switches (4), characterized in that said upper and lower semiconductor switches (4) each consist of a semiconductor switching element (7) and a free wheel diode (6) in parallel.

10. Power bridge (3) according to claim 9, characterized in that said free wheel diode (6) is an intrinsic diode of a transistor of the MOSFET type.

11. Rotary electrical machine system comprising:
a polyphase electric load (1);
a source of voltage (2);
a power bridge (3) according to claim 10, which is connected downstream to said electric load (1) and upstream to said source of voltage (2);
a control device (5).

12. Rotary electrical machine system comprising:
a polyphase electric load (1);
a source of voltage (2);
a power bridge (3) according to claim 9, which is connected downstream to said electric load (1) and upstream to said source of voltage (2); and
a control device (5).

13. Rotary electrical machine system comprising:
a polyphase electric load (1);
a source of voltage (2);
a power bridge (3) which is connected downstream to said electric load (1) and upstream to said source of voltage (2);
a control device (5) according to claim 8.

14. Method for controlling a power bridge (3) according to claim 1, characterized in that said balancing (13) is obtained by selecting (15, 22) a balancing duty cycle (RC1, RC2, RCi, RCn) such as to verify substantially the equation:

$$RC'0*RonH*Iph02+Pcomm.=(1-RC'0)*RonL*Iph02$$

wherein RonH and RonL are respectively the conduction resistances (20) of said upper and lower semiconductor switches (4), Pcomm. represents said switching losses (21), and Iphi represents a phase intensity which circulates in said phase, within a limit where said balancing duty cycle (RC'1, RC'2, RC'i, RC'n) leads to a first balancing phase voltage, a current difference of which, compared with a second balancing phase voltage, is identical to an initial difference between said first set phase voltage (V1, V2, Vi, Vn), and a second set phase voltage (V1, V2, Vi, Vn).

15. Device (5) for controlling a power bridge (3), which is designed to be connected to an electric load (1), and is suitable for implementation of the method according to claim 1, characterized in that it comprises a control logic which is representative of said method, or a computer memory comprising instructions which are representative of said method.

16. A method for controlling a power bridge (3) comprising a plurality of arms (B1, B2, Bi, Bn), wherein each arm comprises, in series, upper and lower semiconductor switches (4) which are designed to be connected in parallel to the first and second terminals (B+, B−) of a common source of voltage (2), at least one middle point of each of said arms (B1, B2, Bi, Bn) being designed to be connected respectively to at least one phase of an electric load (1), said method comprising the steps of:

controlling said upper and lower semiconductor switches (4) in a complementary manner by means of pulses with a set duty cycle (RC1, RC2, RCi, RCn) which is determined according to a first set phase voltage (V1, V2, Vi, Vn), relative to a reference terminal of said electric load (1), and a common mode voltage (V0), relative to one of said first or second terminals (B+, B−);

controlling switching losses (21) of said upper and lower semiconductor switches (4), wherein said common mode voltage (V0) is determined such as to obtain balancing (13) of said switching losses (21) and conduction losses (19) between said upper and lower semiconductor switches (4), and, wherein said balancing (13) is implemented only when an electrical frequency which modulates said set duty cycle (RC1, RC2, RCi, RCn) is equal to, or lower than, a predetermined threshold.

* * * * *